United States Patent [19]
Olsen
[11] 3,917,969
[45] Nov. 4, 1975

[54] ELECTRIC LOAD CONTROL

[76] Inventor: John G. Olsen, 3125 NE. Flanders St., Portland, Oreg. 97232

[22] Filed: Nov. 16, 1973
[21] Appl. No.: 416,477

[52] U.S. Cl. .............. 307/11; 307/252 B
[51] Int. Cl.$^2$ .............. H03K 17/60
[58] Field of Search ........ 307/252 B, 252 N, 252 Q, 307/252 T, 11; 323/22 SC, 24

[56] References Cited
UNITED STATES PATENTS

| | | | |
|---|---|---|---|
| 3,260,898 | 7/1966 | Jones, Jr. | 307/252 N X |
| 3,392,626 | 7/1968 | Miller et al. | 307/252 B |
| 3,486,042 | 12/1969 | Watrous | 307/252 B |
| 3,588,598 | 6/1971 | Isaacs | 307/252 T X |
| 3,603,817 | 9/1971 | Casson | 307/252 B |
| 3,668,422 | 6/1972 | Pascente | 307/252 B X |
| 3,699,390 | 10/1972 | Blakeslee | 307/252 B X |
| 3,715,623 | 2/1973 | Szabo | 307/252 B X |
| 3,723,769 | 3/1973 | Collins | 307/252 B X |
| 3,745,382 | 7/1973 | Hoge et al. | 307/252 B X |
| 3,758,793 | 9/1973 | Pascente | 307/252 B |

*Primary Examiner*—Herman Hohauser
*Attorney, Agent, or Firm*—Eugene D. Farley

[57] ABSTRACT

A secondary electric load is connected to a source of electric potential through a thyristor the activation of which is controlled automatically by a current transformer which senses the electric current in the main supply circuit or in the supply circuit of a primary load, the thyristor being deactivated when the sensed current reaches a predetermined magnitude.

6 Claims, 2 Drawing Figures

ELECTRIC LOAD CONTROL

BACKGROUND OF THE INVENTION

This invention relates to the control of relatively high current electric load circuits, and more particularly to an electric device for controlling the operation of secondary electric loads in response to the activation of a primary electric load.

It is desirable at times, particularly during periods of electrical power shortages, to limit the peak electrical loading of an electric circuit. For example, during use of an electric kitchen range or oven it may be desirable to shut off electric power to a water heater, air conditioner, etc., since the use of such secondary loads may be interrupted for the short period of time during which the range or oven must be used.

The selective control of such relatively high current loads heretofore has been attainable only on a voluntary basis by manual disconnection of secondary loads through mechanical switches.

SUMMARY OF THE INVENTION

In its basic concept, this invention involves the selective activation and deactivation of a thyristor in the electric circuit of a secondary electric load to effect activation and deactivation of the secondary load, deactivation of the thyristor preferably being controlled automatically by attainment of a predetermined magnitude of current in the electric supply curcuit or in the electric circuit of a primary load.

It is by virtue of the foregoing basic concept that the principal objective of this invention is achieved; namely, to overcome the aforementioned disadvantages and limitations of prior procedures for selectively controlling the operation of secondary electric loads.

Another important object of this invention is the provision of an electric load control of the class described in which operation of the thyristor is controlled by a low current circuit.

Still another object of this invention is the provision of an electric load control of the class described which is versatile in its utility, being operable from a main supply circuit or from the circuit of a primary load, to achieve control of a plurality of secondary loads.

The foregoing and other objects and advantages of this invention will appear from the following detailed description, taken in connection with the accompanying drawing of preferred embodiments.

DESCRIPTION OF THE PREFERRED EMBODIMENTS

Figure 1:
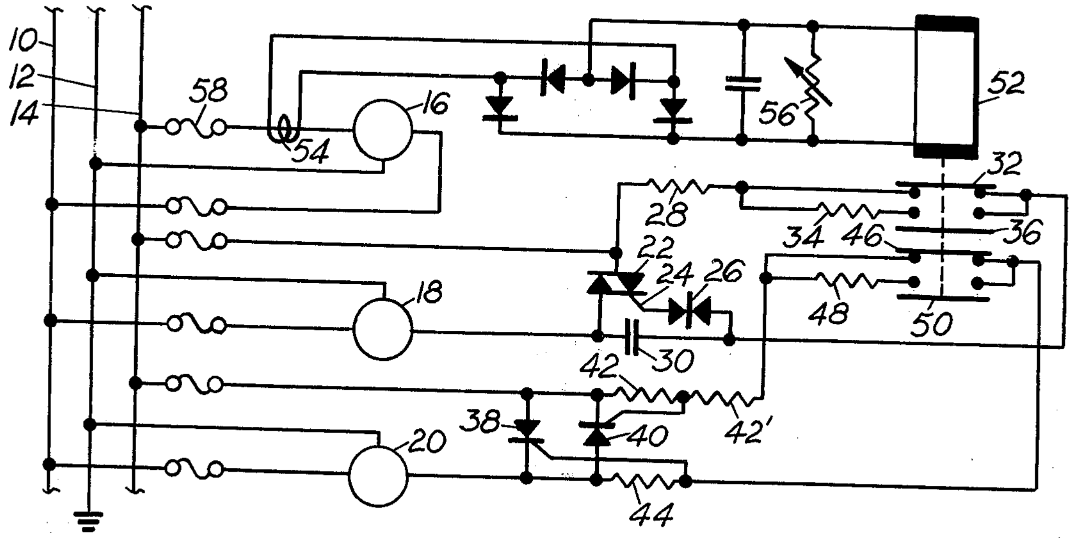
FIGS. 1 and 2 are schematic electrical diagrams illustrating diverse embodiments of the electric load control of this invention in association with a plurality of electric loads.

Referring first to FIG. 1 of the drawing, there is shown, merely for the purpose of illustration, three electric conductors 10, 12 and 14 which deliver a relatively high current source of potential to a primary load 16, such as a kitchen range or oven, and a plurality of secondary loads 18 and 20, such as a water heater and an air conditioner.

In one embodiment of this invention, the secondary load 18 is connected to the supply lines 10, 12, 14 of the source of electric potential through a bidirectional thyristor 22, commonly referred to as a triac. The gate control element 24 of the thyristor is connected to an electric circuit which is operable selectively to supply and remove gate voltage for the thyristor. This gate supply circuit includes a bilateral trigger component 26, commonly referred to as a diac. The gate control circuit also includes a resistor 28 and a capacitor 30 releasably interconnected in series through a normally closed relay contact 32 to provide an RC time constant chosen to effect activation of the trigger component 26 and hence activation of the thyristor 22.

The gate control circuit also includes a resistor 34 which is connectable removably in series with the resistor 28 through a normally open relay contact 36. When the resistor is so connected, the RC time constant is adjusted to reduce the conduction angle of the thyristor to a predetermined value, usually zero degrees. This results in deactivation of the thyristor 22 and consequent opening of the circuit of the secondary load 18.

In another embodiment of this invention, the secondary load 20 is connected to the supply lines 10, 12, 14 through a pair of opposed unidirectional thyristors 38 and 40, commonly referred to as silicon controlled rectifiers. The gate control elements of these thyristors are connected to an electric circuit which selectively supplies and removes gate voltage for the thyristors. This gate supply circuit includes static trigger components comprising the voltage divider resistors 42, 42' and 44 which are connected together in series removably by means of a normally closed relay contact 46.

In manner similar to the resistor 34 described hereinbefore, a resistor 48 also may be connected in series with the resistors 42, 42' and 44 upon closure of the normally open relay contact 50, whereupon the voltage divider network is so modified as to delay the attainment of firing voltage across resistors 42 and 44 to reduce the conduction angle of the thyristors 38 and 40 to a minimum of zero degrees. Under this condition, therefore, the secondary load 20 is disconnected from the supply lines.

The relay contacts 32, 36, 46 and 50 are associated with a relay coil 52 the activation of which effects transfer of the contacts from the gate voltage supply condition illustrated to the alternate position in which insufficient gate voltage is supplied to effect activation of the thyristors, hence opening the supply circuits for the secondary loads 18 and 20. Various means may be provided for selectively activating the relay coil. For example, it may be connected to a source of low voltage supply through a manually operable switch, for voluntary operation. Alternatively, it may be connected to the output of a radio frequency receiver, through appropriate amplification stages, the antenna input of the receiver functioning to receive a radio frequency signal transmitted from a remote location, as from the agency supplying the electric power. As a further alternative, the power supply agency could transmit an alternating current signal through the power supply lines to an amplifier having its output connected to the relay coil.

Figure 2:
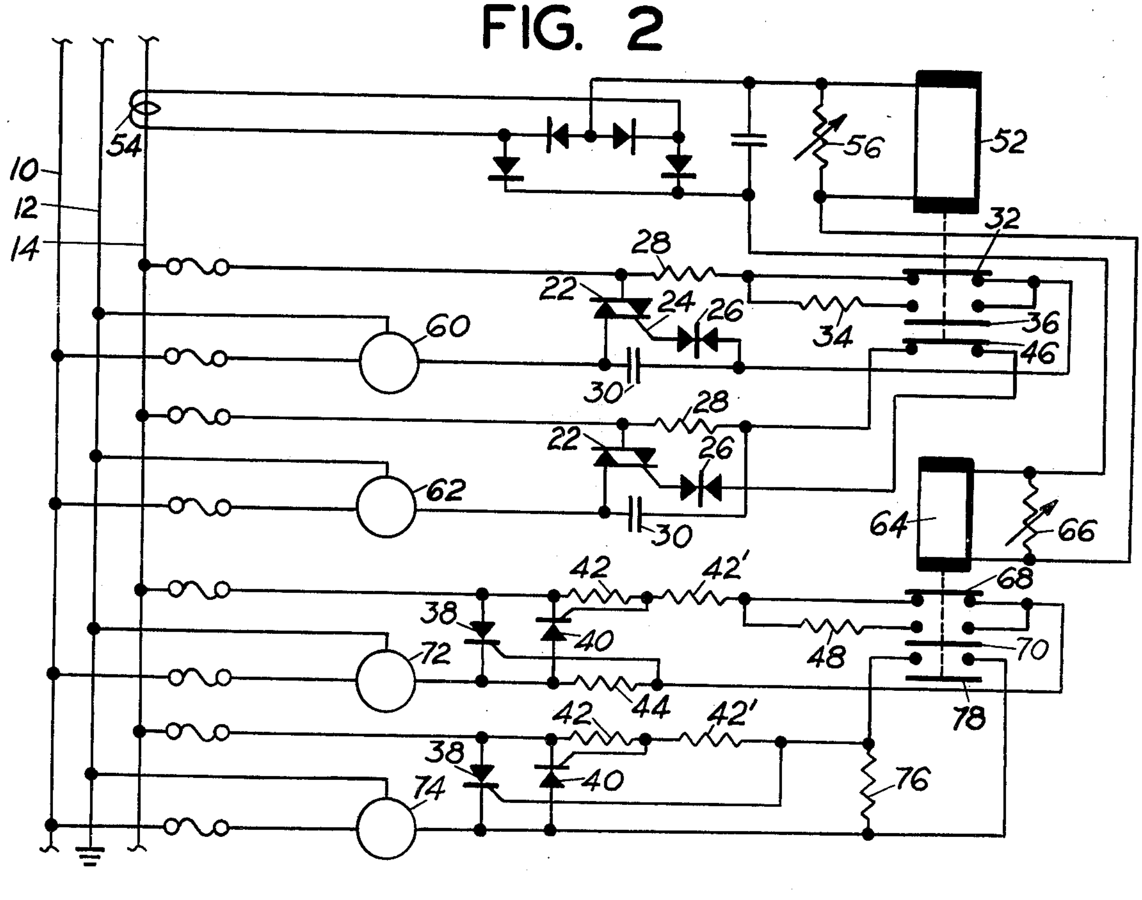

In the preferred embodiment illustrated, the relay coil is connected for activation automatically in response to the attainment of a predetermined magnitude of load either in the supply circuit of a primary load 16 (FIG. 1), or in the main supply circuit (FIG. 2). In either case a toroidal current transformer 54 is connected to the relay coil through appropriate rectification and filtering means, as illustrated. A variable shunt resistor 56 is provided for effecting activation of the relay at various selected load levels sensed by the current transformer.

Means other than the toroidal current transformer illustrated may be utilized to sense the load. For example, the transformer may be replaced by an amplifier connected across a fuse 58, the amplified voltage drop across the fuse functioning to activate the relay coil.

Referring now to FIG. 2 of the drawing, the toroidal current transformer 54 is shown coupled to one of the main power supply lines, as previously mentioned. A primary load 60 is connected to the main supply lines through a bidirectional thyristor 22 and gate voltage control circuit previously described in connection with the secondary load 18 in FIG. 1. In this case, however, the resistor 34 may be chosen to allow continued activation of the thyristor 22 at a reduced conduction angle and hence continued operation of the primary load 60 at a lower effective voltage, upon switching of the relay contacts 32 and 36.

The secondary load 62 is connected to the main supply lines through a bidirectional thyristor 22. However, in this embodiment the gate voltage circuit does not include the resistor 34, and hence is merely opened by the contact 46 upon activation of the relay coil 52.

In the embodiment of FIG. 2 there is also provided an auxiliary relay the coil 64 of which is shown connected in series with the main relay coil 52. A variable shunting resistor 66 serves to effect activation of the auxiliary relay coil at a higher or lower level of load sensed by the current transformer 54. The contacts 68 and 70 of the auxiliary relay serve to control the gate voltage circuit of unidirectional thyristors 38 and 40 associated with the secondary load 72. In this regard, the thyristors and gate voltage circuit associated with the secondary load is the same configuration as previously described in connection with the secondary load 20 of FIG. 1.

As a further alternative, the gate voltage supply circuit associated with the secondary load 74 includes a resistor 76 which is removably shunted by the normally open relay contact 78, whereby selectively to supply and remove gate voltage for the unidirectional thyristors 38 and 40.

From the foregoing, it will be appreciated that the present invention provides simplified and economical means by which to control one or more relatively high current secondary loads, as they relate to the operation of a primary load. The control of this invention does not degrade the service to the loads and is devoid of mechanical switch contacts in the high current circuits. The control may be arranged advantageously to provide automatic control of secondary loads in response to activation of a primary load, whereby to avoid the uncertainties and other disadvantages associated with voluntary manual operation.

It will be apparent to those skilled in the art that various changes may be made in the type, number and arrangement of parts described hereinbefore without departing from the spirit of this invention.

Having now described my invention and the manner in which it may be used, I claim:

1. A control for an electric load circuit connected to an electric supply circuit, comprising:

a. thyristor means in said load circuit arranged in series with the load, b. the thyristor means including a gate control element having an electric gate voltage supply circuit, c. switch means in said gate voltage supply circuit for selectively supplying and removing gate voltage for said thyristor means, d. electric switch operator means having an electric circuit, and e. a current transformer in the electric switch operator means and arranged to operatively couple the circuit of the switch operator means to said electric supply circuit in parallel with the circuit of the load for sensing the electric current in said supply circuit, f. the electric switch operator means being activated upon attainment of a predetermined magnitude of sensed current in the supply circuit to operate the switch means to open the electric load circuit.

2. The control of claim 1 wherein the current transformer is a toroidal current transformer.

3. The control of claim 1 wherein the switch means is the contact of a relay and the switch operator means is the coil of said relay.

4. The control of claim 3 including variable resistance means across said coil for effecting activation of the relay at various selected load levels sensed by the current transformer.

5. The control of claim 1 wherein the current transformer is arranged to be coupled directly to said electric supply circuit.

6. The control of claim 1 wherein a second electric load circuit is connected to the electric supply circuit in parallel with the load circuit to be controlled, and wherein the current transformer is arranged to be coupled to said second electric load circuit.

* * * * *